US012761526B2

(12) United States Patent
Wang et al.

(10) Patent No.: US 12,761,526 B2
(45) Date of Patent: Oct. 13, 2026

(54) VARIABLE APERTURE, CAMERA MODULE AND ELECTRONIC DEVICE

(71) Applicant: Beijing Xiaomi Mobile Software Co., Ltd., Beijing (CN)

(72) Inventors: Hui Wang, Beijing (CN); Xinjie Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 174 days.

(21) Appl. No.: 18/737,267

(22) Filed: Jun. 7, 2024

(65) Prior Publication Data

US 2025/0138394 A1 May 1, 2025

(30) Foreign Application Priority Data

Oct. 26, 2023 (CN) ......................... 202311403345.7

(51) Int. Cl.
*G03B 9/06* (2021.01)
*G03B 17/12* (2021.01)
*G03B 30/00* (2021.01)

(52) U.S. Cl.
CPC ............... *G03B 9/06* (2013.01); *G03B 17/12* (2013.01); *G03B 30/00* (2021.01)

(58) Field of Classification Search
CPC ............. G03B 9/06; G03B 9/10; G03B 30/00
See application file for complete search history.

(56) References Cited

U.S. PATENT DOCUMENTS

| | | | | | |
|---|---|---|---|---|---|
| 2002/0034390 | A1* | 3/2002 | Naganuma | ............... | G03B 9/08 348/E5.04 |
| 2020/0401014 | A1* | 12/2020 | Seo | .......................... | G03B 9/06 |
| 2024/0040256 | A1* | 2/2024 | Jang | ......................... | G03B 3/10 |

FOREIGN PATENT DOCUMENTS

| | | | | |
|---|---|---|---|---|
| CN | 219697780 U * | 9/2023 | ............... | G03B 9/06 |
| CN | 219831587 U | 10/2023 | | |
| EP | 4 235 295 A1 | 8/2023 | | |
| EP | 4 266 123 A1 | 10/2023 | | |
| EP | 4 266 672 A1 | 10/2023 | | |

OTHER PUBLICATIONS

Extended European Search Report issued Feb. 11, 2025 in European Patent Application No. 24194346.3, 8 pages.

* cited by examiner

*Primary Examiner* — Minh Q Phan
(74) *Attorney, Agent, or Firm* — Oblon, McClelland, Maier & Neustadt, L.L.P.

(57) ABSTRACT

Disclosed in the present application are a variable aperture, a camera module and an electronic device, which relate to the field of electronic technology. The variable aperture includes a roller, a rotation bracket, a plurality of blades and a base. The base is annular. The base is sleeved outside the rotation bracket. The roller is located between the base and the rotation bracket and is in rollable connection with the base and the rotation bracket. The multiple blades are annularly distributed on one side of the base and are encircled to form an aperture hole, multiple blades are in rotatable connection with the base and in slidable connection with the rotation bracket.

17 Claims, 13 Drawing Sheets

VARIABLE APERTURE, CAMERA MODULE AND ELECTRONIC DEVICE

CROSS-REFERENCE TO RELATED APPLICATIONS

The present application is based upon and claims the benefit of priority to Chinese Application No. 2023114033457, filed on Oct. 26, 2023, the entire contents thereof are incorporated herein by reference.

TECHNICAL FIELD

The present disclosure relates to the field of electronic technology, and in particular to a variable aperture, a camera module, and an electronic device.

BACKGROUND

In order to improve the camera performance of mobile phones, the camera module of the mobile phone is equipped with a variable aperture to adjust the amount of light entering the lens. In the related art, a variable aperture includes a plurality of blades, a rotating component and a fixed component. The rotating component can rotate relative to the fixed component and drive the multiple blades to open and close to adjust the size of the aperture. The rotating parts and the fixed parts are connected by balls.

It should be noted that, information disclosed in the above background portion is provided only for better understanding of the background of the present disclosure, and thus it may contain information that does not form the prior art known by those ordinary skilled in the art.

SUMMARY

In view of this, the present disclosure provides a variable aperture, a camera module and an electronic device.

Specifically, the present disclosure includes the following technical solutions:

In one aspect, embodiments of the present disclosure provide a variable aperture including a roller, a rotation bracket, a plurality of blades and a base;

wherein the base is annular, the base is sleeved outside the rotation bracket, the roller is located between the base and the rotation bracket, and is in rollable connection with the base and the rotation bracket;

the plurality of blades are annularly distributed on one side of the base and are encircled to form an aperture hole, and the plurality of blades are in rotatable connection with the base and in slidable connection with the rotation bracket.

In another aspect, embodiments of the present disclosure provide a camera module, including the above variable aperture, a lens assembly, a first actuator and a second actuator device;

wherein the variable aperture is connected with the lens assembly and is located on a light entrance side of the lens assembly, the first actuator is connected with a side of the lens assembly away from the variable aperture, and the second actuator is connected with a side of the first actuator away from the lens assembly.

In another aspect, embodiments of the present disclosure provide an electronic device, including the above camera module.

It is to be understood that both the foregoing general description and the following detailed description are exemplary and explanatory only and are not restrictive of the present disclosure.

BRIEF DESCRIPTION OF THE DRAWINGS

In order to more clearly illustrate the technical solutions in the embodiments of the present disclosure, the drawings needed to be used in the description of the embodiments will be briefly introduced below. Obviously, the drawings in the following description are only some embodiments of the present disclosure. For those of ordinary skill in the art, other drawings can also be obtained based on these drawings without exerting creative efforts.

The reference symbols in the figure respectively indicate:

1—housing assembly; 2—variable aperture; 3—lens assembly; 4—first actuator; 5—second actuator;

20—roller; 21—rotation bracket; 22—blade; 23—base; 24—stator; 25—rotor; 26—flexible circuit board; 27—gasket; 28—cover plate; 41—basis; 42—lens holder; 43—first elastic piece; 44—second elastic piece; 45—second magnet; 46—second coil; 51—support member; 52—bearing member; 53—SMA wire; 54—ball;

211—mounting groove; 212—sliding column; 213—second limiting part; 220—aperture hole; 221—rotation hole; 222—guide groove; 223—first edge; 224—second edge;

231—accommodating groove; 232—through hole; 233—first limiting part; 234—rotation shaft; 235—limiting column; 270—translucent hole; 411—receiving cavity; 521—groove.

Clear embodiments of the present disclosure have been shown through the above-mentioned drawings and will be described in more detail below. These drawings and written description are not intended to limit the scope of the disclosed concepts in any way, but rather to illustrate the concepts of the present disclosure to those skilled in the art with reference to the specific embodiments.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, rather than all of the embodiments. Based on the embodiments in this disclosure, all other embodiments obtained by those of ordinary skill in the art without creative efforts fall within the scope of protection of this disclosure.

Figure 1:
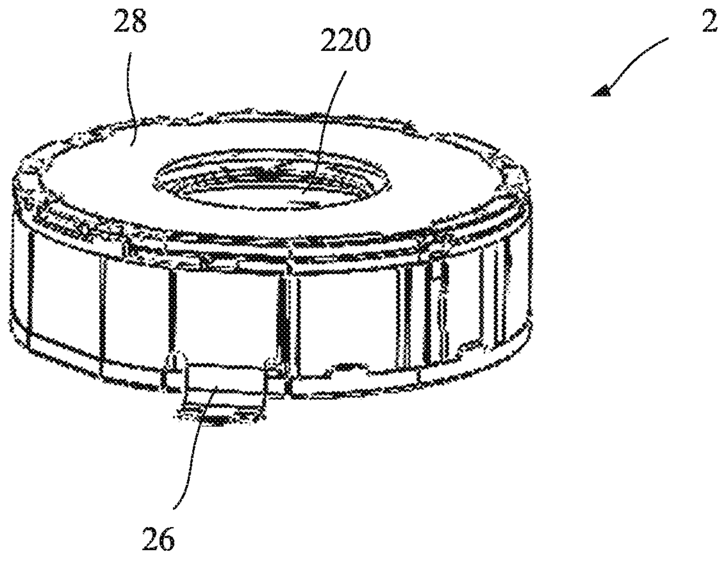
FIG. 1 is a schematic diagram of a variable aperture provided by an embodiment of the present disclosure.
Figure 2:
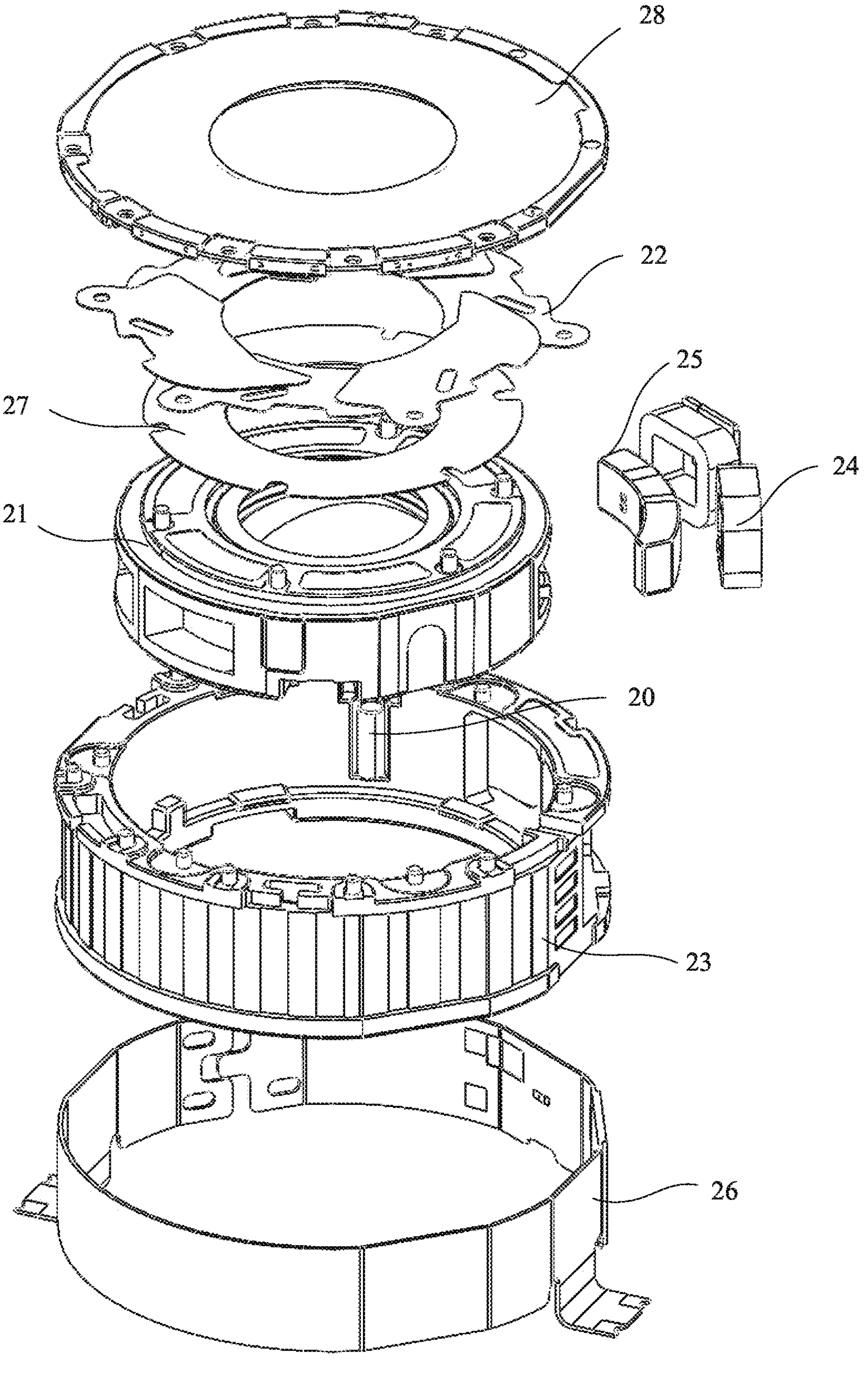
FIG. 2 is an exploded view of the variable aperture provided by an embodiment of the present disclosure.

The embodiment of the present disclosure provides a variable aperture. FIG. 1 is a schematic diagram of the variable aperture provided by the embodiment of the present disclosure. FIG. 2 is an exploded view of the variable aperture provided by the embodiment of the present disclosure. As shown in FIGS. 1 and 2, the variable aperture 2 includes a roller 20, a rotation bracket 21, a plurality of blades 22 and a base 23. The base 23 is annular and is sleeved outside the rotation bracket 21. The roller 20 is located between the base 23 and the rotation bracket 21 and is in rollable connection with the base 23 and the rotation bracket 21. The plurality of blades 22 are annularly distributed on one side of the base 23 and encircles to form the aperture hole 220. The plurality of blades 22 are in rotatable connection with the base 23 and in slidable connection with the rotation bracket 21.

In the variable aperture 2 provided by the embodiment of the present disclosure, a plurality of blades 22 are arranged on one side of the base 23, are rotationally connected to the base 23, and are slidingly connected to the rotation bracket 21 to form an aperture hole 220 with an adjustable aperture. A roller 20 is provided between the base 23 and the rotation bracket 21. The roller 20 can roll when the rotation bracket 21 rotates relative to the base 23, reducing the friction between the base 23 and the rotation bracket 21. Since the roller 20 has a larger contact area with the base 23 and the rotation bracket 21, the roller 20 can absorb more energy when it is impacted. The roller 20, the base 23 and the rotation bracket 21 are not easily deformed, which improves the relative rotation stability of the base 23 and the rotation bracket 21.

In order to make the technical solutions and advantages of the present disclosure clearer, the embodiments of the present disclosure will be described in further detail below with reference to the accompanying drawings.

As shown in FIG. 2, the variable aperture 2 provided by the embodiment of the present disclosure includes a roller 20, a rotation bracket 21, a plurality of blades 22 and a base 23. The base 23 is annular, the rotation bracket 21 is cylindrical, the base 23 is sleeved outside the rotation bracket 21, and the base 23 and the rotation bracket 21 are coaxially arranged. The plurality of blades 22 are located on the same side of the base 23 and the rotation bracket 21, and each blade 22 is in slidable connection with the rotation bracket 21 and in rotatable connection with the base 23. The roller 20 is located between the outer surface of the rotation bracket 21 and the base 23, and the roller 20 abuts the rotation bracket 21 and the base 23 respectively. The rotation bracket 21 can rotate relative to the base 23, and when the rotation bracket 21 rotates relative to the base 23, the roller 20 can roll, thereby reducing the friction between the rotation bracket 21 and the base 23. A plurality of blades 22 encircle to form the aperture hole 220. When the rotation bracket 21 rotates relative to the base 23, the blades 22 rotate relative to the base 23, thereby changing the size of the aperture hole 220.

In some embodiments of the present disclosure, as shown in FIG. 2, the variable aperture 2 also includes a cover plate 28. The cover plate 28 covers the side of the blade 22 away from the rotation bracket 21 and is connected to the base 23. The cover 28 is used to cover the plurality of blades 22, the rotation bracket 21 and the base 23 to protect the variable aperture 2.

In some embodiments of the present disclosure, as shown in FIG. 2, the variable aperture 2 also includes a stator 24 and a rotor 25. The stator 24 is connected to the inner peripheral side of the base 23, and the rotor 25 is connected to the outer peripheral side of the rotation bracket 21. The stator 24 is opposite to the rotor 25. The stator 24 and the rotor 25 are configured to drive the movement of the rotor 25 so that the rotation bracket 21 can rotate relative to the base 23, thereby driving drive a plurality of blades 22 to move to adjust the size of the aperture hole 220.

Optionally, referring to FIG. 2, the stator 24 is a first coil and the rotor 25 is a first magnet. After the first coil is energized, the ring current can exert repulsive force on the first magnet, causing the first magnet to drive the rotation bracket 21 to rotate.

In some embodiments of the present disclosure, as shown in FIG. 2, the variable aperture 2 also includes a flexible circuit board 26. The flexible circuit board 26 is annular and is sleeved outside the base 23. The flexible circuit board 26 is electrically connected to the first coil. The flexible circuit board 26 surrounds the outer side of the base 23 and is fixedly connected to the base 23. The flexible circuit board 26 is used to energize the first coil to drive the rotation bracket 21 to rotate.

Figure 3:
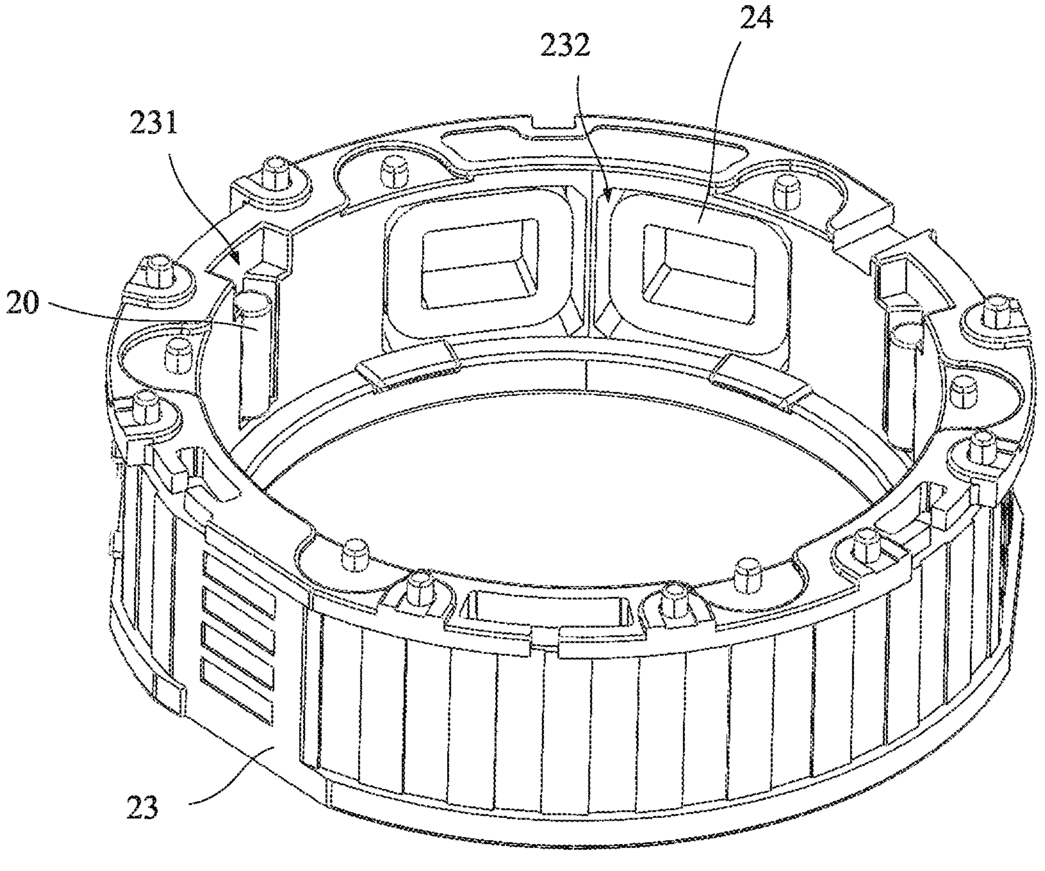
FIG. 3 is a schematic diagram of the base of the variable aperture provided by an embodiment of the present disclosure.

FIG. 3 is a schematic diagram of the base of the variable aperture provided by an embodiment of the present disclosure. In some embodiments of the present disclosure, as shown in FIG. 3, an accommodating groove 231 is provided on the inner peripheral side of the base 23, and the roller 20 is located in the accommodating groove 231. The cylindrical surface of the roller 20 abuts the bottom of the accommodating groove 231 and the outer peripheral side of the rotation bracket 21 respectively. The depth of the accommodating groove 231 in the wall thickness direction of the base 23 is slightly smaller than the diameter of the roller 20, so that the cylindrical surface of the roller 20 can protrude from the inner peripheral side of the base 23 and can abut the rotation bracket 21. The accommodating groove 231 can reduce the distance between the rotation bracket 21 and the base 23, so that the roller 20 has a larger diameter, which is beneficial to increasing the contact surface area between the roller 20 and the rotation bracket 21 and the base 23, thereby improving rotational stability.

Optionally, referring to FIG. 3, there are two rollers 20 and two accommodating grooves 231 respectively. The two rollers 20 are located in the two accommodating grooves 231 respectively, and the stator 24 is located between the two rollers 20. The two rollers 20 have the same size and are located close to the stator 24, so that a certain distance can be maintained between the stator 24 and the rotor 25. In other embodiments, there may be multiple rollers 20, and the size of each roller 20 may also be different.

In some embodiments of the present disclosure, as shown in FIG. 3, the base 23 is provided with a through hole 232, and the stator 24 is located in the through hole 232. One side of the stator 24 is opposite to the rotor 25, and the side of the stator 24 away from the rotor 25 is connected to the flexible circuit board 26 to provide power to the stator 24.

Exemplarily, the base 23 is provided with two through holes 232, the variable aperture 2 includes two stators 24, each stator 24 is located in one through hole 232, and the two through holes 232 are located between two accommodating grooves 231, thereby increasing the overlapping area of the stator 24 and the rotor 25.

Figure 4:
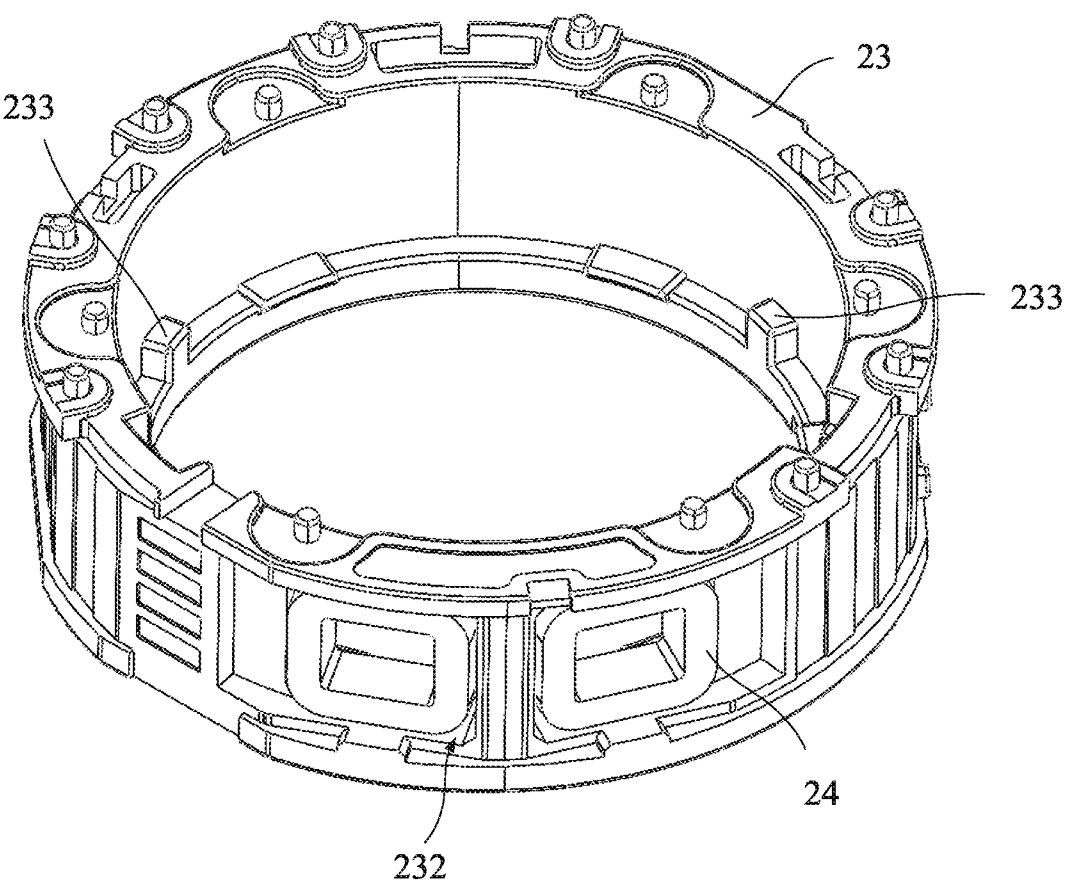
FIG. 4 is a schematic diagram of the base of the variable aperture provided by an embodiment of the present disclosure.

FIG. 4 is a schematic diagram of the base of the variable aperture provided by an embodiment of the present disclosure. In some embodiments of the present disclosure, as shown in FIG. 4, a first limiting portion 233 is provided on the inner peripheral side of the base 23, and the first limiting portion 233 is located on the side of the base 23 away from the blade 22. The first limiting part 233 can cooperate with the rotation bracket 21 to limit the angle through which the rotation bracket 21 can rotate.

Figure 5:
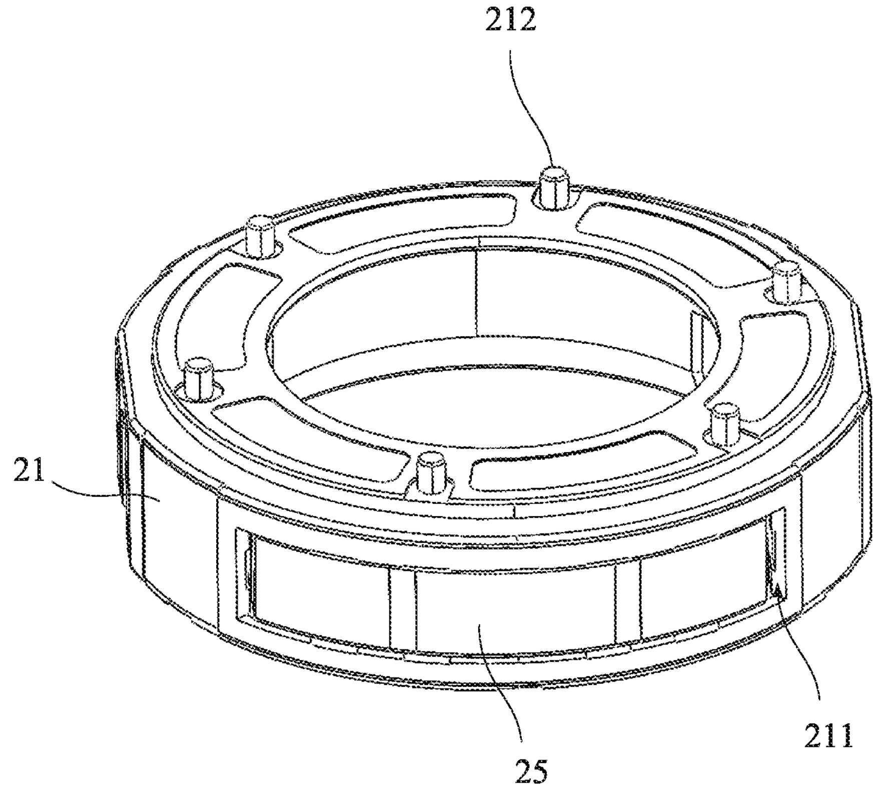
FIG. 5 is a schematic diagram of the rotation bracket of the variable aperture provided by an embodiment of the present disclosure.

FIG. 5 is a schematic diagram of the rotation bracket of the variable aperture provided by an embodiment of the present disclosure. In some embodiments of the present disclosure, as shown in FIG. 5, the rotation bracket 21 is provided with a mounting groove 211, and the rotor 25 is located in the mounting groove 211. The rotor 25 is fixedly connected to the rotation bracket 21, and the surface of the rotor 25 close to the stator 24 is cylindrical, so that during the rotation of the rotation bracket 21, the distance between the rotor 25 and the stator 24 is maintained constant.

Figure 6:
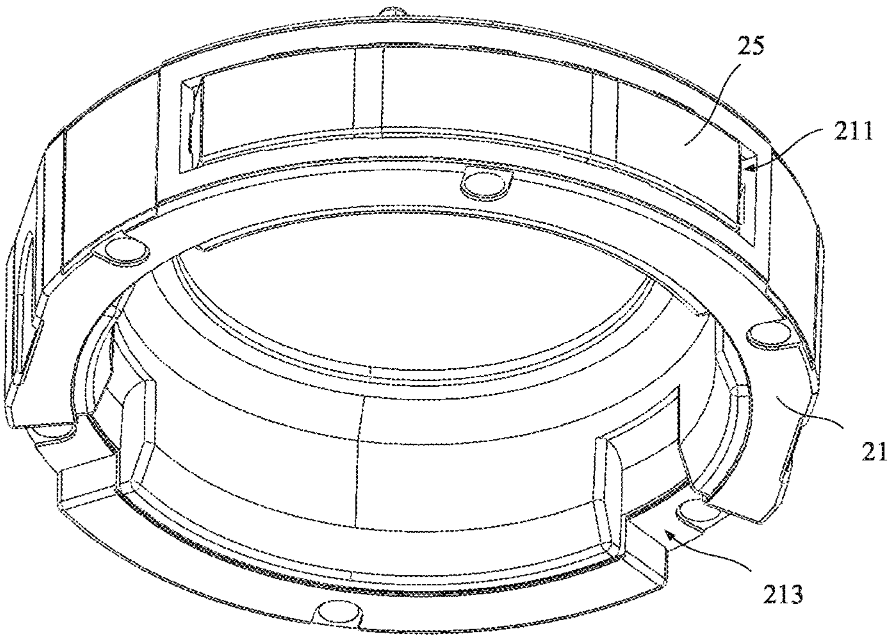
FIG. 6 is a schematic diagram of the rotation bracket of the variable aperture provided by an embodiment of the present disclosure.

FIG. 6 is a schematic diagram of the rotation bracket of the variable aperture provided by an embodiment of the present disclosure. In some embodiments of the present disclosure, as shown in FIG. 6, the end of the rotation bracket 21 away from the blade 22 is provided with a second limiting part 213, and the second limiting part 213 is used to cooperate with the first limiting part 233 to limit the angle that the rotation bracket 21 can rotate.

For example, the first limiting part 233 includes two convex parts, the second limiting part 213 includes two grooves, each convex part is located in a groove, the width of the groove is greater than the width of the convex part, thereby providing a rotatable space for the rotation bracket 21.

Figure 7:
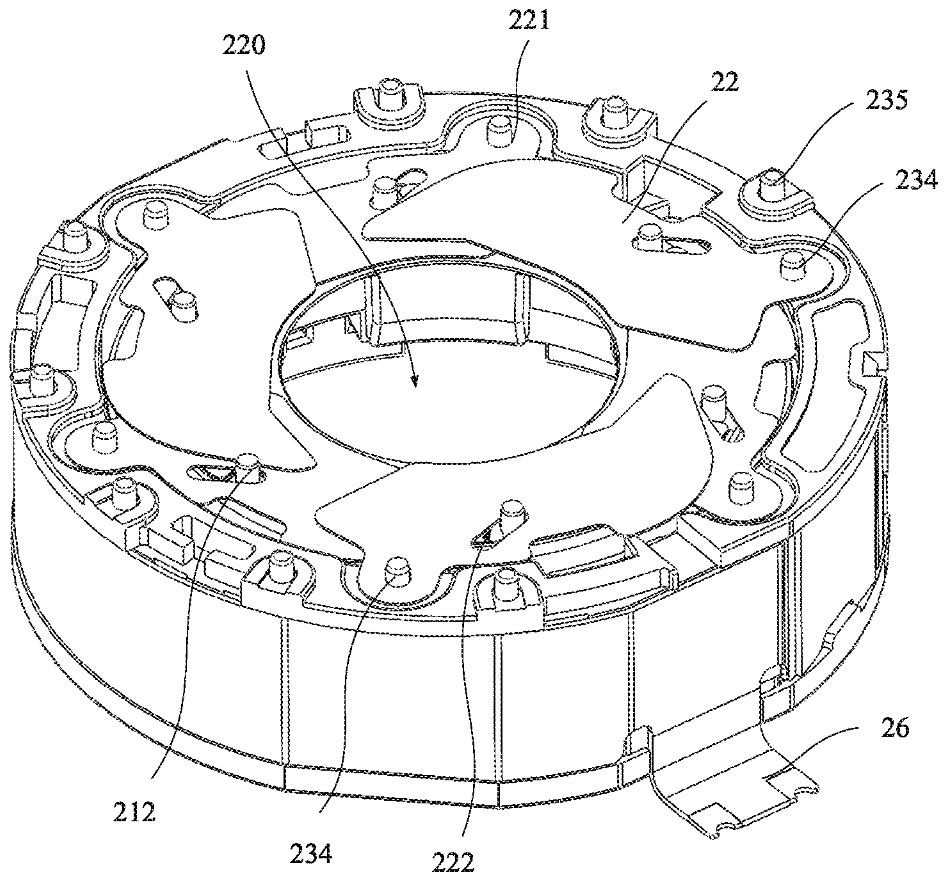
FIG. 7 is a schematic diagram of the variable aperture provided by an embodiment of the present disclosure.

FIG. 7 is a schematic diagram of a variable aperture provided by an embodiment of the present disclosure. In some embodiments of the present disclosure, as shown in FIG. 7, the blade 22 is provided with a rotation hole 221 and a guide groove 222, and a rotation shaft 234 is provided on the end surface of the base 23. The rotation shaft 234 is in rotatable fit with the rotation hole 221. A sliding column 212 is provided on the end face of the rotation bracket 21, and the sliding column 212 is in slidable fit with the guide groove 222. When the rotation bracket 21 rotates relative to the base 23, the sliding column 212 slides in the guide groove 222, thereby driving the blade 22 to rotate about the rotation shaft 234, thereby adjusting the size of the aperture hole 220.

Exemplarily, the variable aperture 2 includes six blades 22, three blades 22 are overlapped on the other three blades 22, the blades 22 of the same layer are spaced apart from each other, and the blades 22 of one layer are overlapped on the gap between two adjacent blades 22 of the other layer.

The aperture hole 220 formed by the blade 22 provided by the embodiment of the present disclosure has a changing range of f/1.4-f/4. When the aperture hole 220 becomes the smallest, the camera module provided with the variable aperture 2 can be used to capture starbursts, and can obtain better imaging effects. The variable aperture 2 provided by the embodiment of the present disclosure can realize stepless adjustment of the aperture. That is, by accurately controlling the relative rotation angle between the base 23 and the rotation bracket 21 in the variable aperture 2, the movement step of each blade 22 is smaller, thereby resulting in many kinds of aperture including the shape of the aperture hole 2 shown in FIG. 7, to meet the imaging needs of users in various usage scenarios.

For example, when using the variable aperture 2 to take a video, the light in the captured scene may undergo gradual changes or sudden changes. The variable aperture 2 provided by the embodiment of the present disclosure can adjust the size of the aperture according to the ambient light in real time, thereby achieving ultra-high exposure flexibility, automatically adapting to the change of light, and achieving better imaging results.

Figure 8:
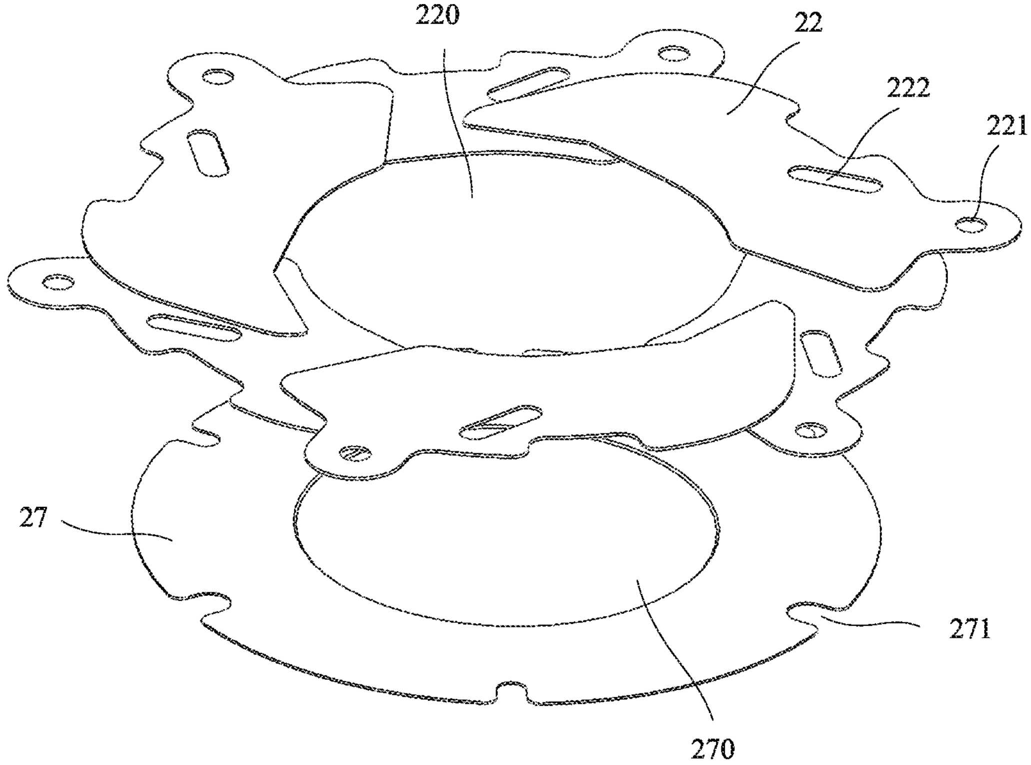
FIG. 8 is a schematic diagram of a blade and a gasket of the variable aperture provided by an embodiment of the present disclosure.

FIG. 8 is a schematic diagram of blades and gaskets providing a variable aperture according to an embodiment of the present disclosure. In some embodiments of the present disclosure, as shown in FIG. 8, the variable aperture 2 also includes a gasket 27. The gasket 27 is located between the blade 22 and the rotation bracket 21. The gasket 27 has a light-transmitting hole 270 that transmits light. The light-transmitting hole 270 and the aperture hole 220 are arranged concentrically.

It should be noted that the diameter of the light transmission hole 270 is not larger than the maximum diameter of the aperture hole 220. The light-transmitting hole 270 can limit the maximum effective diameter of the aperture hole 220, so that when the aperture of the variable aperture 2 is the largest, the projection of the blade 22 on the gasket 27 does not overlap with the light-transmitting hole 270.

Referring to FIG. 7, a plurality of limiting columns 235 are provided at one end of the base 23 close to the blade 22, and the plurality of limiting columns 235 are arranged along the axis of the base 23. As shown in FIG. 8, a plurality of limiting grooves 271 are provided in the circumferential direction of the gasket 27. Each limiting groove 271 is engaged to the outside of the limiting column 235 to fix the gasket 27 and the base 23, to prevent the gasket 27 from being driven to move when the blade 23 rotates.

Figure 9:
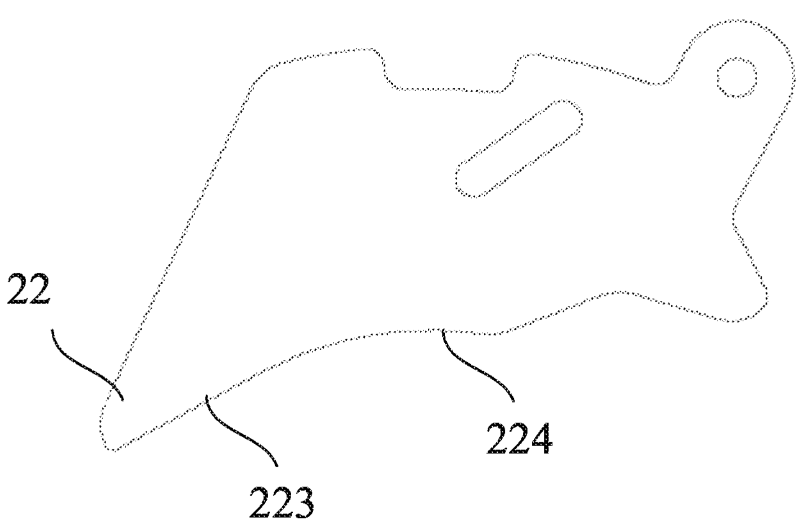
FIG. 9 is a schematic diagram of a blade of the variable aperture provided by an embodiment of the present disclosure.

FIG. 9 is a schematic diagram of the blades of the variable aperture provided by an embodiment of the present disclosure. In some embodiments of the present disclosure, as shown in FIG. 9, the blade 22 includes a first edge 223 and a second edge 224. One end of the first edge 223 is connected to one end of the second edge 224. The edge 223 is linear, the second edge 224 is curved, the aperture hole 220 is bounded by the first edge 223 of each blade 22, or the aperture hole 220 is bounded by the first edge 223 and the second edge 224 of each blade 22.

Specifically, when the diameter of the aperture hole 220 is larger, the aperture hole 220 is bounded by the first edge 223 and the second edge 224 of each blade 22. When the diameter of the aperture hole 220 is smaller, the aperture hole 220 is bounded by the first edge 223 of each blade 22.

Optionally, the blades 22 provided by the embodiment of the present disclosure are in the shape of a cicada wing, and the thickness of each blade 22 is 40 μm-120 μm.

Optionally, the thickness of the blade 22 provided by the embodiment of the present disclosure is 55 μm. The blade 22 is made of polyimide, and the surface of the blade 22 is plated with a carbon layer. Polyimide is a high-temperature resistant material that is not easily deformed and can extend the service life of the blades 22. The carbon layer can ensure the light-proof performance of the blade 22, which is beneficial to improving the photographing effect. In the process of manufacturing the blade 22, chemical vapor deposition, magnetron sputtering, physical vapor deposition and other processes can be selected to achieve carbon plating. Optionally, carbon plating can be performed on one or both sides of the blades 22.

Figure 10:
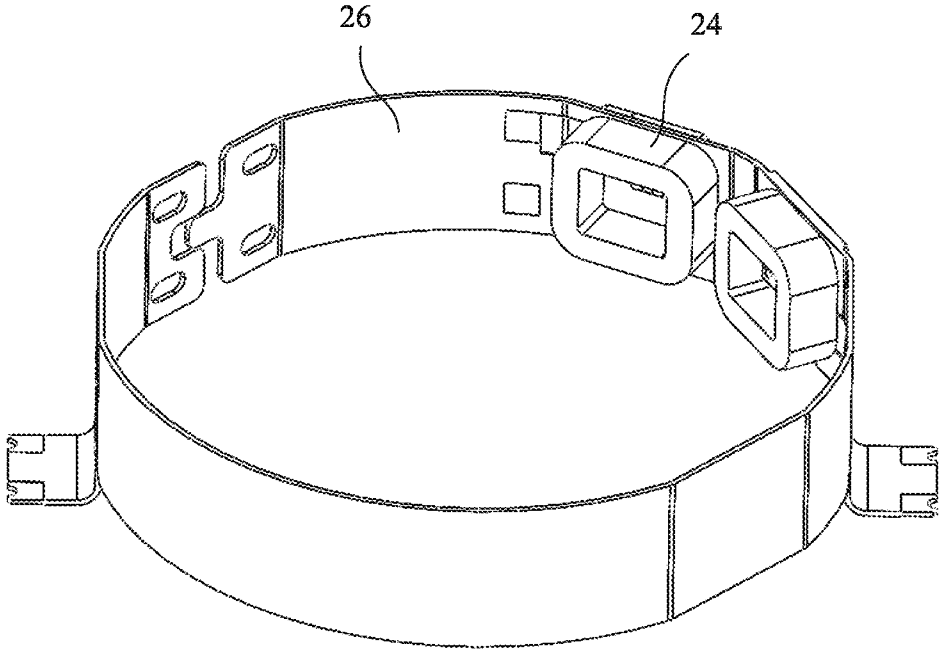
FIG. 10 is a schematic diagram of a flexible circuit board and a stator of a variable aperture provided by an embodiment of the present disclosure.

FIG. 10 is a schematic diagram of a flexible circuit board and a stator of a variable aperture provided by an embodiment of the present disclosure. As shown in FIG. 10, the stator 24 is located in the through hole 232, and the side of the stator 24 away from the rotor 25 is connected to the inner peripheral side of the flexible circuit board 26.

Figure 11:
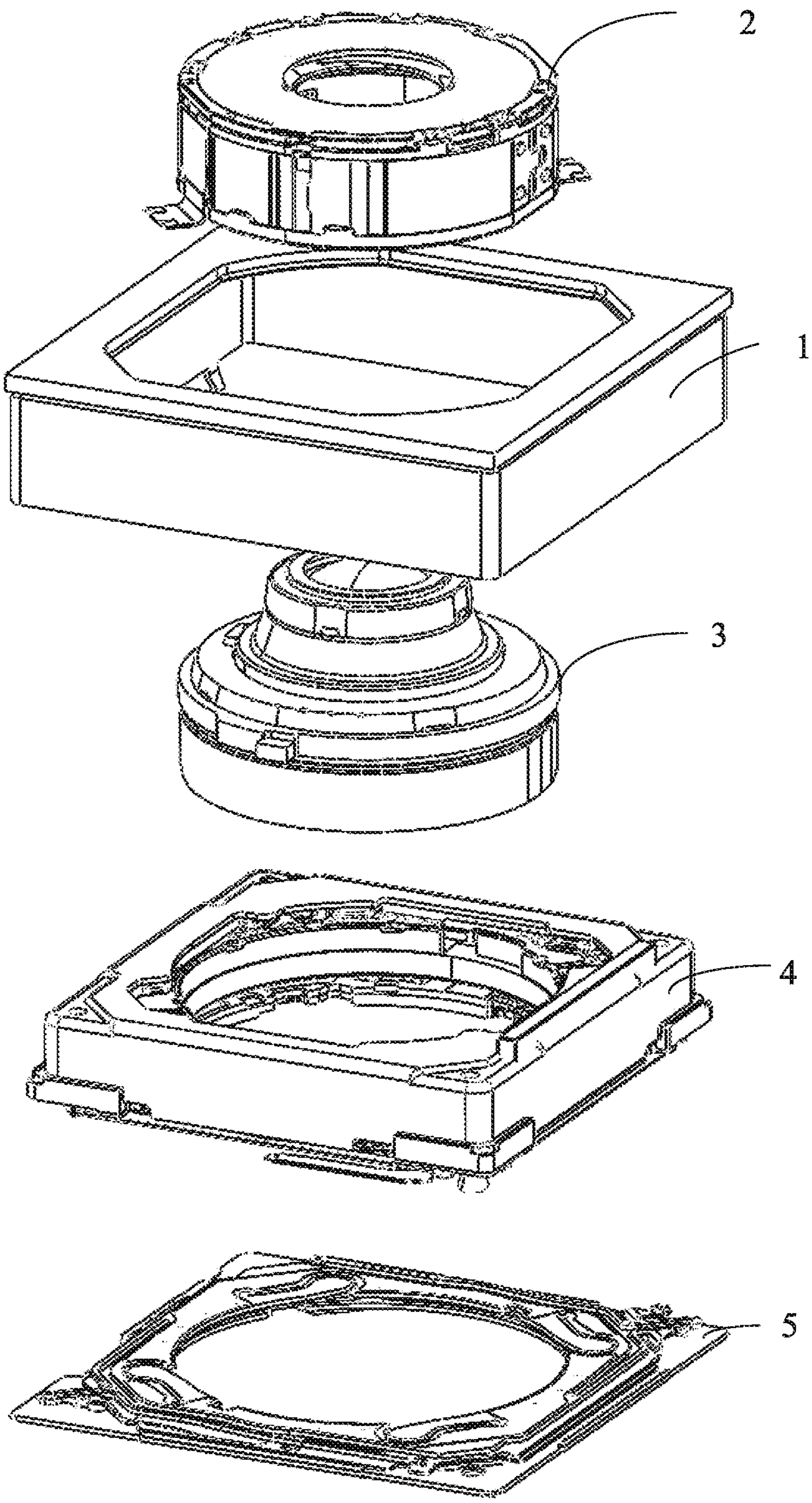
FIG. 11 is an exploded view of a camera module provided by an embodiment of the present disclosure.

In addition, an embodiment of the present disclosure also provides a camera module. FIG. 11 is an exploded view of the camera module provided by an embodiment of the present disclosure. As shown in FIG. 11, the camera module includes any of the variable apertures 2 in the above embodiments, a lens assembly 3, a first actuator 4 and a second actuator 5. The variable aperture 2 is connected to the lens assembly 3 and is located on the light entrance side of the lens assembly 3. The first actuator 4 is connected to the side of the lens assembly 3 away from the variable aperture 2. The second actuator 5 is connected to the side of the first actuator 4 is away from the lens assembly 3.

In the camera module provided by the embodiment of the present disclosure, multiple blades 22 of the variable aperture 2 are arranged on one side of the base 23, are rotationally connected with the base 23, and are slidingly connected with the rotation bracket 21 to form an aperture hole 220 with adjustable aperture size. A roller 20 is provided between the base and the rotation bracket. The roller 20 can roll when the rotation bracket 21 rotates relative to the base 23, thereby reducing the friction between the base 23 and the rotation bracket 21. Since the roller 20 has a larger contact area with the base 23 and the rotation bracket 21, the roller 20 can absorb more energy when it is impacted. The roller 20, the base 23 and the rotation bracket 21 is not easily deformed, which improves the relative rotation stability of the base 23 and the rotation bracket 21, and is conducive to increasing the service life of the camera module. The first actuator 4 and the second actuator 5 can adjust the position of the lens assembly 3, so that the camera module can realize the functions of autofocus and optical image stabilization.

In some embodiments of the present disclosure, as shown in FIG. 11, the camera module further includes a housing component 1, the housing component 1 is covered on the variable aperture 2, and the housing component 1 is connected to the second actuator 5.

Figure 12:
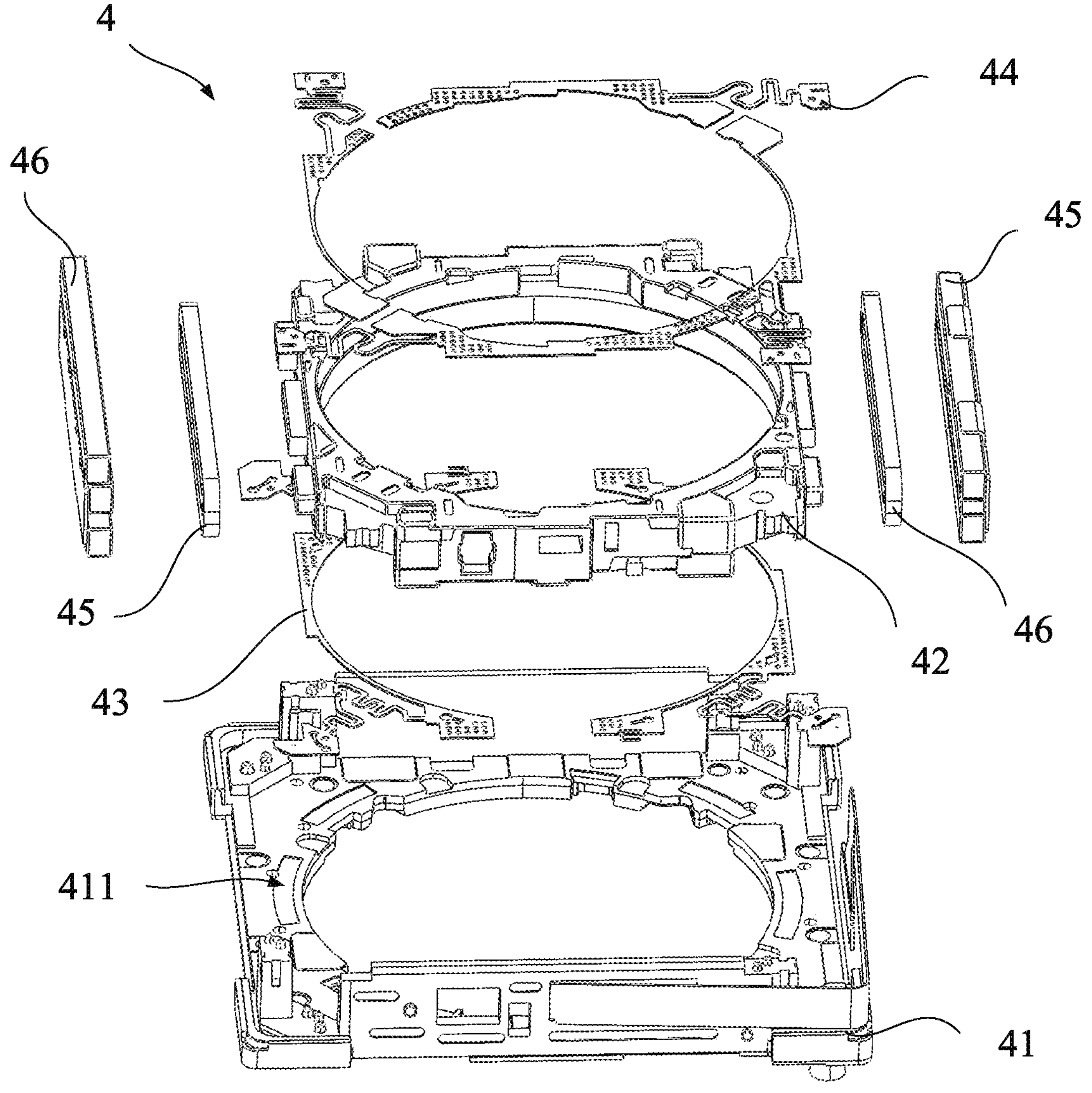
FIG. 12 is an exploded view of the first actuator of the camera module provided by an embodiment of the present disclosure.

FIG. 12 is an exploded view of the first actuator of the camera module provided by an embodiment of the present disclosure. In some embodiments of the present disclosure, as shown in FIG. 12, the first actuator 4 includes a basis 41 and a lens frame 42. The lens frame 42 is connected to the lens assembly 3. The basis 41 has a receiving cavity 411, and the lens frame 42 is located in the receiving cavity 411 and is movably connected with the basis 41. The lens frame 42 can telescopically move relative to the basis 41, thereby driving the lens assembly 3 to move closer to or away from the basis 41, so that the lens assembly 3 can automatically focus.

Optionally, as shown in FIG. 12, the first actuator 4 also includes a first elastic piece 43 and a second elastic piece 44. The lens holder 42 is located between the first elastic piece 43 and the second elastic piece 44. The first elastic piece 43 is connected to the lens frame 42 and the basis 41 respectively, and the second elastic piece 44 is connected to the lens frame 42 and the basis 41 respectively. The first elastic piece 43 and the second elastic piece 44 can elastically deform when the lens frame 42 moves relative to the basis 41, increasing the resistance when the lens frame 42 moves, and allowing the lens frame 42 to automatically return to the initial position.

Exemplarily, both the first elastic piece 43 and the second elastic piece 44 are annular, and the inner ring areas of the first elastic piece 43 and the second elastic piece 44 are connected with the lens frame 42. The outer ring areas of the first elastic piece 43 and the second elastic piece 44 are connected with the basis 41.

In some embodiments of the present disclosure, as shown in FIG. 12, the first actuator 4 also includes a second magnet 45 and a second coil 46. The second magnet 45 is connected to the basis 41, and the second coil 46 is connected to the lens holder 42, the second magnet 45 is opposite to the second coil 46. The second coil 46 is connected to the flexible circuit board 26 to provide power to the second coil 46.

Exemplarily, the first actuator 4 includes two second magnets 45 and two second coils 46. The two second magnets 45 are located on opposite sides of the lens frame 42, and the two second coils 46 located on opposite sides of the lens frame 42, the two second coils 46 can be energized at the same time to control the movement of the two second magnets 45, thereby improving the stability of the lens frame 41 when moving.

Figure 13:
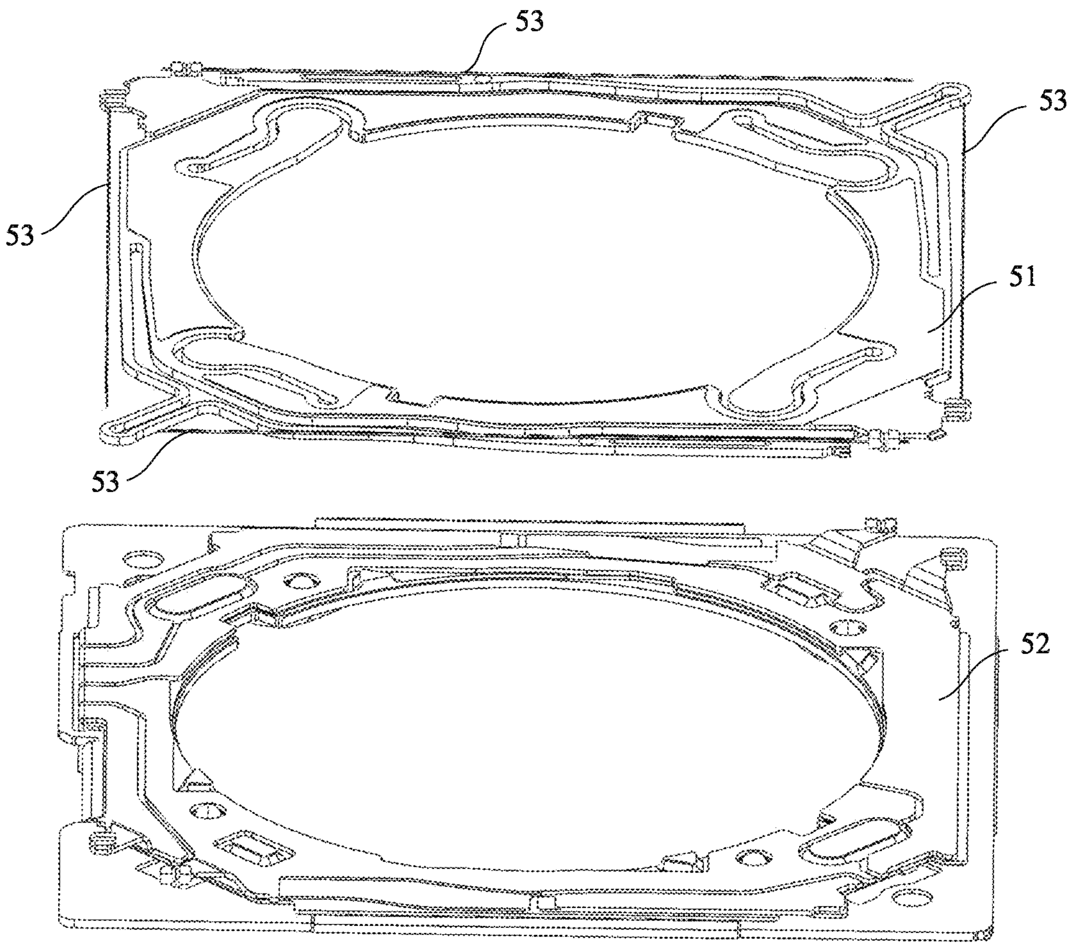
FIG. 13 is an exploded view of the second actuator of the camera module provided by an embodiment of the present disclosure.

FIG. 13 is an exploded view of the second actuator of the camera module provided by an embodiment of the present disclosure. In some embodiments of the present disclosure, as shown in FIG. 13, the second actuator 5 includes a support member 51 and a bearing member 52. One side of the support member 51 is connected to the first actuator 4, and the side of the support member 51 away from the first actuator 4 is movably connected to the bearing member 52. The support member 51 can translate relative to the bearing member 52 in a first plane, which is parallel to the plane where the bearing member 52 is located. The second actuator 5 is used to adjust the position of the lens assembly 3 so that the camera module has an optical anti-shake function.

In some embodiments of the present disclosure, as shown in FIG. 13, the second actuator 5 includes at least four SMA (shape memory alloys) wires 53, the support member 51 has four sides, and the SMA wires 53 are respectively located on the four sides of the support member 51, one end of each SMA wire 53 is connected to the corner of the support member 51, and the other end of each SMA wire is connected to the bearing member 52. The length of the SMA wire 53 changes when energized, thereby enabling the support member 51 to translate relative to the bearing member 52.

Figure 14:
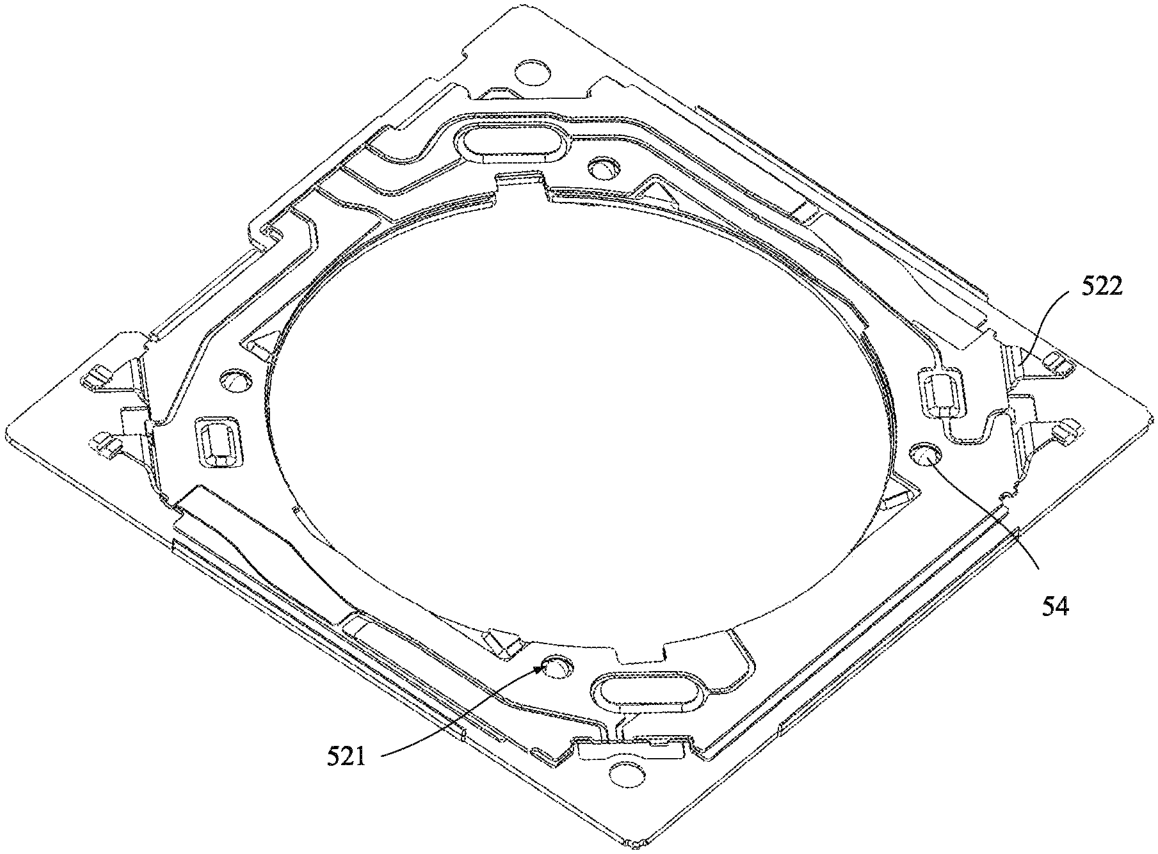
FIG. 14 is a schematic diagram of the support member of the second actuator provided by an embodiment of the present disclosure.

FIG. 14 is a schematic diagram of a support member of the second actuator provided by an embodiment of the present disclosure. In some embodiments of the present disclosure, as shown in FIG. 14, the second actuator 5 also includes a plurality of balls 54, and the bearing member 52 is provided with a plurality of grooves 521 on a side close to the support member 51. The balls 54 are located in the groove 521, and the balls 54 abut the support member 51. When the support member 51 moves relative to the bearing member 52, the balls 54 can cause rolling friction between the support member 51 and the bearing member 52, thereby reducing the friction between the support member 51 and the bearing member 52.

Figure 15:
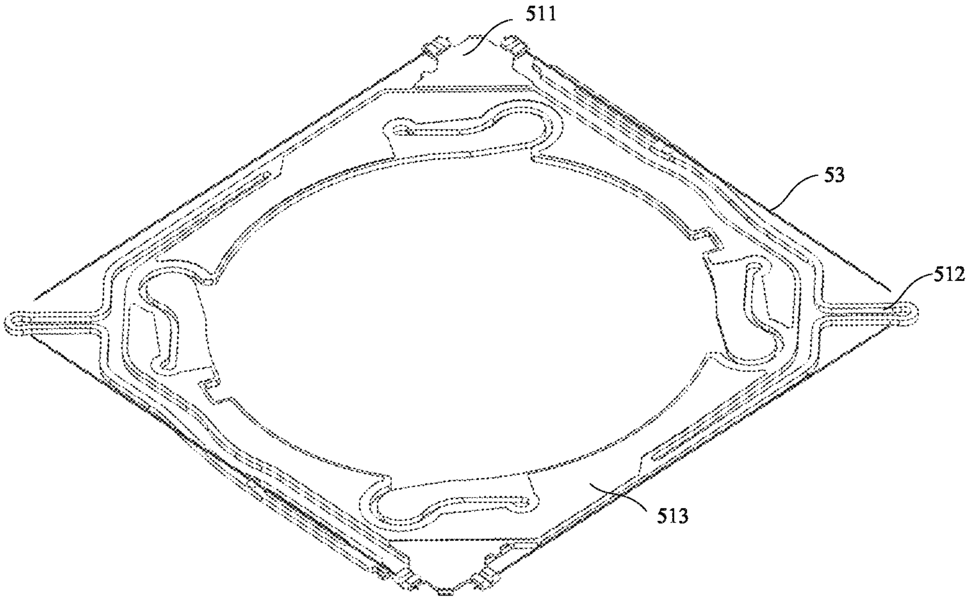
FIG. 15 is a schematic diagram of the bearing member of the second actuator provided by an embodiment of the present disclosure.

FIG. 15 is a schematic diagram of the bearing member of the second actuator provided by an embodiment of the present disclosure. Optionally, as shown in FIG. 15, the support member 51 includes a main part 513, two first connecting parts 511 and two elastic parts 512. The main part 513 is rectangular, the two first connecting parts 511 are respectively connected to two mutually spaced corners of the main part 513, and the two elastic parts 512 are respectively connected to the other two corners of the main part 513. One end of two adjacent SMA lines 53 is connected to one first connecting portion 511, and one end of the other two adjacent SMA lines 53 is connected to another first connecting portion 511. The two elastic parts 512 can elastically deform when the support member 51 moves relative to the bearing member 52 to limit the movable distance of the support member 51 and restore the position of the support member 51.

Figure 16:
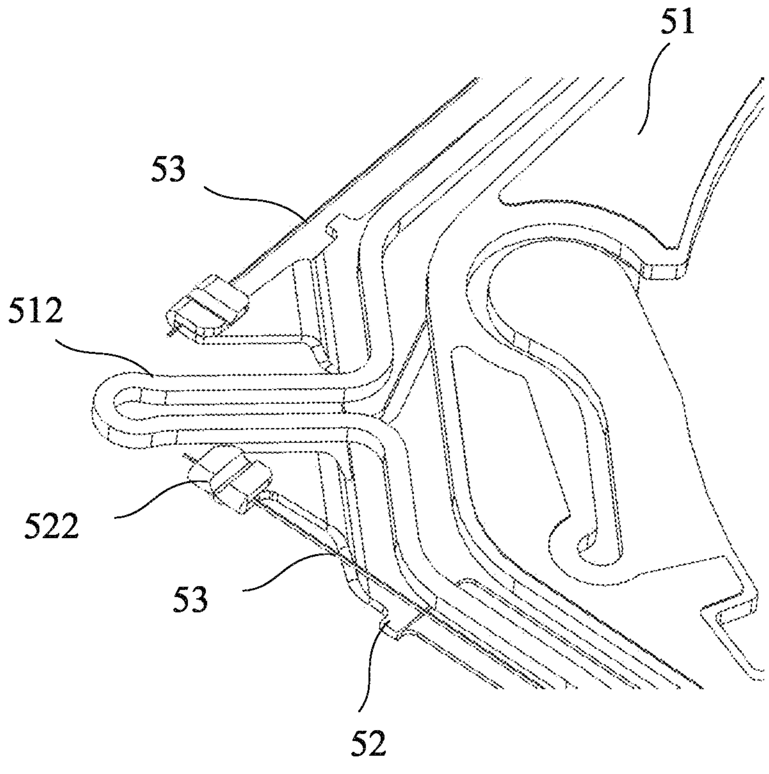
FIG. 16 is a partial schematic diagram of a second actuator provided by an embodiment of the present disclosure.

FIG. 16 is a partial schematic diagram of a second actuator provided by an embodiment of the present disclosure. As shown in FIG. 16, the bearing member 52 has two second connecting parts 522. The other ends of two adjacent SMA lines 53 are connected to one second connecting part 522, and the other ends of the other two adjacent SMA lines 53 are connected to another second connecting part 522. The second connecting part 522 and the first connecting part 511 are located on the same plane to prevent the SMA line 53 from bending during deformation.

Optionally, as shown in FIG. 16, the elastic part 512 is in the shape of a meandering strip, and is bent at the corner of the main part 513 to form a U-shaped structure. The U-shaped structure is located between the ends of two adjacent SMA lines 53.

In addition, embodiments of the present disclosure also provide an electronic device, including any camera module provided in the above embodiments.

In the electronic device provided by the embodiment of the present disclosure, a plurality of blades 22 of the camera module are arranged on one side of the base 23, are rotationally connected with the base 23, and are slidingly connected with the rotation bracket 21 to form an aperture hole 220 with an adjustable aperture size. A roller 20 is provided between the base 23 and the rotation bracket 21. The roller 20 can roll when the rotation bracket 21 rotates relative to the base 23, reducing the friction force between the base 23 and the rotation bracket 21. Since the roller 20 has a larger contact area with the base 23 and the rotation bracket 21, the roller 20 can absorb more energy when it is impacted. The roller 20, the base 23 and the rotation bracket 21 is not easily deformed, which improves the relative rotation stability of the base 23 and the rotation bracket 21, and is conducive to increasing the service life of the camera module. The first actuator 4 and the second actuator 5 can adjust the position of the lens assembly 3, so that the camera module can realize the functions of autofocus and optical image stabilization.

In view of this, the present disclosure provides a variable aperture, a camera module and an electronic device, which can improve the structural stability of the variable aperture.

Specifically, the present disclosure includes the following technical solutions:

In one aspect, embodiments of the present disclosure provide a variable aperture including a roller, a rotation bracket, a plurality of blades and a base;

wherein the base is annular, the base is sleeved outside the rotation bracket, the roller is located between the base and the rotation bracket, and is in rollable connection with the base and the rotation bracket;

the plurality of blades are annularly distributed on one side of the base and are encircled to form an aperture hole, and the plurality of blades are in rotatable connection with the base and in slidable connection with the rotation bracket.

Optionally, an accommodating groove is provided on an inner peripheral side of the base, the roller is located in the accommodating groove, a cylindrical surface of the roller is abutted against a bottom wall of the accommodating groove and an outer peripheral side of the rotation bracket respectively.

Optionally, an accommodating groove is provided on an inner peripheral side of the base, the roller is located in the accommodating groove, a cylindrical surface of the roller is abutted against a bottom wall of the accommodating groove and an outer peripheral side of the rotation bracket respectively.

Optionally, the variable aperture further includes a stator and a rotor, wherein the stator is connected with the inner peripheral side of the base, the rotor is connected with the outer peripheral side of the rotation bracket, and the stator is opposite to the rotor.

Optionally, the variable aperture includes two rollers and two accommodating grooves, the two rollers are respectively located in the two accommodating grooves, and the stator is located between the two rollers.

Optionally, the rotation bracket is provided with a mounting groove, and the rotor is located in the mounting groove.

Optionally, the base is provided with a through hole, and the stator is located in the through hole.

Optionally, the stator is a first coil, and the rotor is a first magnet.

Optionally, the variable aperture further includes a flexible circuit board, the flexible circuit board is annular and is sleeved outside the base, the flexible circuit board is electrically connected with the first coil.

Optionally, the blade is provided with a rotation hole and a guide groove, and an end surface of the base is provided with a rotation shaft, the rotation shaft is rotationally matched with the rotation hole, an end surface of the rotation bracket is provided with a sliding column, and the sliding column slidably matched with the guide groove.

Optionally, the variable aperture further includes a gasket, wherein the gasket is located between the blade and the rotation brackets, the gasket has a light-transmitting hole, and the light-transmitting hole and the aperture hole are arranged concentrically.

Optionally, a thickness of the blade is 40 μm-120 μm.

Optionally, the thickness of the blade is 55 μm.

Optionally, the blade includes a first edge and a second edge, one end of the first edge is connected with one end of the second edge, the first edge is linear, and the second edge is curved shape, the aperture hole is bounded by the first edge of each blade, or the aperture hole is bounded by the first edge and the second edge of each blade.

In another aspect, embodiments of the present disclosure provide a camera module, including the above variable aperture, a lens assembly, a first actuator and a second actuator device;

wherein the variable aperture is connected with the lens assembly and is located on a light entrance side of the lens assembly, the first actuator is connected with a side of the lens assembly away from the variable aperture, and the second actuator is connected with a side of the first actuator away from the lens assembly.

Optionally, the first actuator includes a basis and a lens holder, the lens holder is connected with the lens assembly, the basis includes a receiving cavity, and the lens holder is located in the receiving cavity and in moveable connection with the basis.

Optionally, the first actuator further includes a first elastic piece and a second elastic piece, the lens holder is located between the first elastic piece and the second elastic piece, the first elastic piece is connected with the lens holder and the basis respectively, and the second elastic piece is connected with the lens holder and the basis respectively.

Optionally, the first actuator further includes a second magnet and a second coil, the second magnet is connected with the basis, the second coil is connected with the lens holder, and the second magnet is opposite to the second coil.

Optionally, the second actuator includes a support member and a bearing member, the support member is connected with the first actuator, and a side of the support member away from the first actuator is in movable connection with the bearing member.

Optionally, the second actuator includes at least four SMA wires, the support member has four sides, the SMA wires are respectively located on the four sides of the support member, one end of each SMA wire is connected with a corner of the support member, and another end of each SMA wire is connected with the bearing member.

Optionally, the second actuator further includes a plurality of balls, a surface of the bearing member close to the support member is provided with a plurality of grooves, the balls are located in the grooves, and the balls are abutted against the support member.

In another aspect, embodiments of the present disclosure provide an electronic device, including the above camera module.

The beneficial effects of the technical solutions provided by the embodiments of the present disclosure include at least:

In the variable aperture provided by the embodiment of the present disclosure, a plurality of blades are arranged on one side of the base, are in rotatable connection with the base and in slidable connection with the rotation bracket, to form an aperture hole with an adjustable aperture. A roller is provided between the base and the rotation bracket, and the roller can roll when the rotation bracket rotates relative to the base, thereby reducing the friction between the base and the rotation bracket. Since the rollers have a larger contact area with the base and the rotation bracket, the rollers, the base and the rotation bracket are not easily deformed when impacted, which improves the relative rotation stability of the base and the rotation bracket.

Electronic devices provided by embodiments of the present disclosure may be, but are not limited to smartphones, tablets, MP3 players (Moving Picture Experts Group Audio Layer III), MP4 (Moving Picture Experts Group Audio Layer IV) players, and laptops. The electronic device may also be referred to as a user device, a portable terminal, a laptop terminal, and other names.

It should be noted that "several" and "at least one" mentioned in this article refer to one or more, and "multiple" and "at least two" refer to two or more. "And/or" describes the relationship between related objects, indicating that there can be three relationships. For example, A and/or B can mean: A exists alone, A and B exist simultaneously, and B exists alone. The character "/" generally indicates that the related objects are in an "or" relationship.

In the description of the present disclosure, it should be noted that, unless otherwise clearly stated and limited, the terms "installation", "connection" and "connected" should be understood in a broad sense. For example, it can be a fixed connection or a detachable connection, or integral connection; it can be a mechanical connection; it can be a direct connection or an indirect connection through an intermediate medium; it can be an internal connection between two elements or an interactive relationship between two elements. For those of ordinary skill in the art, the specific meanings of the above terms in this disclosure can be understood according to specific circumstances.

In this disclosure, unless otherwise expressly stated and limited, a first feature "on" or "below" a second feature may include the first and second features in direct contact, or may include the first and second features not in direct contact but in contact through additional features between them. Furthermore, the first feature being "upper", "over" and "above" a second feature include the first feature being directly above and diagonally above the second feature, or simply mean that the first feature is higher in level than the second feature. The first feature being "lower", "under" and "below" the second feature includes the first feature being directly below and diagonally below the second feature, or simply means that the first feature is lower in level than the second feature.

In the description of the present disclosure, it should be understood that the orientation or positional relationship indicated by the terms "center", "longitudinal", "transverse", "length", "width", "thickness", "upper", "lower", "front", ""back", "left", "right", "vertical", "horizontal", "top", "bottom", "inside", "outside", "clockwise", "counter-clockwise", "axis direction", "radial direction", "circumferential direction", etc. is based on the orientation or positional relationship shown in the drawings, and is only for the convenience of describing the present application and simplifying the description, and does not indicate or imply that the mentioned device or element must have a specific orientation, be constructed and operate in a specific orientation, and therefore are not to be construed as limitations on the disclosure.

In the description of this specification, the description with reference to the terms "certain embodiments," "one embodiment," "some embodiments," "illustrative embodiments," "examples," "specific examples," or "some examples" means that a specific feature, structure, material or characteristic described in connection with the embodiment or example is included in at least one embodiment or example of the present disclosure.

The above are only examples of the present disclosure and are not intended to limit the present disclosure. Any modifications, equivalent substitutions, improvements, etc. made within the spirit and principles of the present disclosure shall be included in the scope of protection of the present disclosure.

What is claimed is:

1. A camera module, comprising:

a variable aperture;

a lens assembly;

a first actuator;

a second actuator;

wherein the variable aperture comprises:

a roller;

a rotation bracket;

a plurality of blades; and a base, wherein the base is annular and is sleeved outside the rotation bracket, the roller is located between the base and the rotation bracket and is in a rollable connection with the base and the rotation bracket, the plurality of blades are annularly distributed on one side of the base and are encircled to form an aperture hole, and the plurality of blades are in a rotatable connection with the base and in a slidable connection with the rotation bracket, the variable aperture is connected with the lens assembly and is located on a light entrance side of the lens assembly, the first actuator is connected with a side of the lens assembly away from the variable aperture, and the second actuator is connected with a side of the first actuator away from the lens assembly, the second actuator includes a support member and a bearing member, wherein the support member is connected with the first actuator, and a side of the support member away from the first actuator is in a movable connection with the bearing member, and the second actuator includes at least four shape memory alloy (SMA) wires, the support member has four sides, the SMA wires are respectively located on the four sides of the support member, one end of each of the SMA wires is connected with a corner of the support member, and another end of each of the SMA wires is connected with the bearing member.

2. The camera module according to claim 1, wherein an accommodating groove is provided on an inner peripheral side of the base, the roller is located in the accommodating groove, and a cylindrical surface of the roller is abutted against a bottom wall of the accommodating groove and an outer peripheral side of the rotation bracket, respectively.

3. The camera module according to claim 2, wherein the variable aperture further comprises:

a stator; and a rotor, wherein the stator is connected with the inner peripheral side of the base, the rotor is connected with the outer peripheral side of the rotation bracket, and the stator is disposed opposite to the rotor.

4. The camera module according to claim 3, wherein the variable aperture includes two rollers and two accommodating grooves, the two rollers are respectively located in the two accommodating grooves, and the stator is located between the two rollers.

5. The camera module according to claim 3, wherein the rotation bracket is provided with a mounting groove, and the rotor is located in the mounting groove.

6. The camera module according to claim 3, wherein the base is provided with a through hole, and the stator is located in the through hole.

7. The camera module according to claim 3, wherein the stator is a first coil, and the rotor is a first magnet.

8. The camera module according to claim 7, further comprising a flexible circuit board, wherein the flexible circuit board is annular and is sleeved outside the base, and the flexible circuit board is electrically connected with the first coil.

9. The camera module according to claim 8, wherein each of the plurality of blades is provided with a rotation hole and a guide groove, and an end surface of the base is provided with a rotation shaft, the rotation shaft is rotationally matched with the rotation hole, an end surface of the rotation bracket is provided with a sliding column, and the sliding column is slidably matched with the guide groove.

10. The camera module according to claim 1, further comprising a gasket, wherein the gasket is located between each of the plurality of blades and the rotation bracket, the gasket has a light-transmitting hole, and the light-transmitting hole and the aperture hole are arranged concentrically.

11. The camera module according to claim 1, wherein a thickness of each of the plurality of blades is 40 μm-120 μm.

12. The camera module according to claim 1, wherein each of the plurality of blades includes a first edge and a second edge, wherein one end of the first edge is connected with one end of the second edge, the first edge is linear, and the second edge has a curved shape, the aperture hole is bounded by the first edge of each of the plurality of blades, or the aperture hole is bounded by the first edge and the second edge of each of the plurality of blades.

13. The camera module according to claim 1, wherein the first actuator includes a basis and a lens holder, wherein the lens holder is connected with the lens assembly, the basis includes a receiving cavity, and the lens holder is located in the receiving cavity and in a moveable connection with the basis.

14. The camera module according to claim 13, wherein the first actuator further includes a first elastic piece and a second elastic piece, wherein the lens holder is located between the first elastic piece and the second elastic piece, the first elastic piece is connected with the lens holder and the basis, respectively, and the second elastic piece is connected with the lens holder and the basis, respectively.

15. The camera module according to claim 13, wherein the first actuator further includes a magnet and a coil, wherein the magnet is connected with the basis, the coil is connected with the lens holder, and the magnet is disposed opposite to the coil.

16. The camera module according to claim 1, wherein the second actuator further includes a plurality of balls, a surface of the bearing member close to the support member is provided with a plurality of grooves, the balls are located in the grooves, and the balls are abutted against the support member.

17. An electronic device, comprising a camera module, the camera module including:

a variable aperture;

a lens assembly;

a first actuator; and a second actuator, wherein the variable aperture is connected with the lens assembly and is located on a light entrance side of the lens assembly, the first actuator is connected with a side of the lens assembly away from the variable aperture, and the second actuator is connected with a side of the first actuator away from the lens assembly, wherein the variable aperture includes:

a roller;

a rotation bracket;

a plurality of blades; and a base, wherein the base is annular and is sleeved outside the rotation bracket, the roller is located between the base and the rotation bracket and is in a rollable connection with the base and the rotation bracket, the plurality of blades are annularly distributed on one side of the base and are encircled to form an aperture hole, the plurality of blades are in a rotatable connection with the base and in a slidable connection with the rotation bracket, the second actuator includes a support member and a bearing member, wherein the support member is connected with the first actuator, and a side of the support member away from the first actuator is in a movable connection with the bearing member, and the second actuator includes at least four shape memory alloy (SMA) wires, the support member has four sides, the SMA wires are respectively located on the four sides of the support member, one end of each of the SMA wires is connected with a corner of the support member, and another end of each of the SMA wires is connected with the bearing member.

* * * * *